Nov. 8, 1938.    F. W. HILD    2,136,356
DRILLING CONTROL
Filed Dec. 31, 1935    2 Sheets-Sheet 2
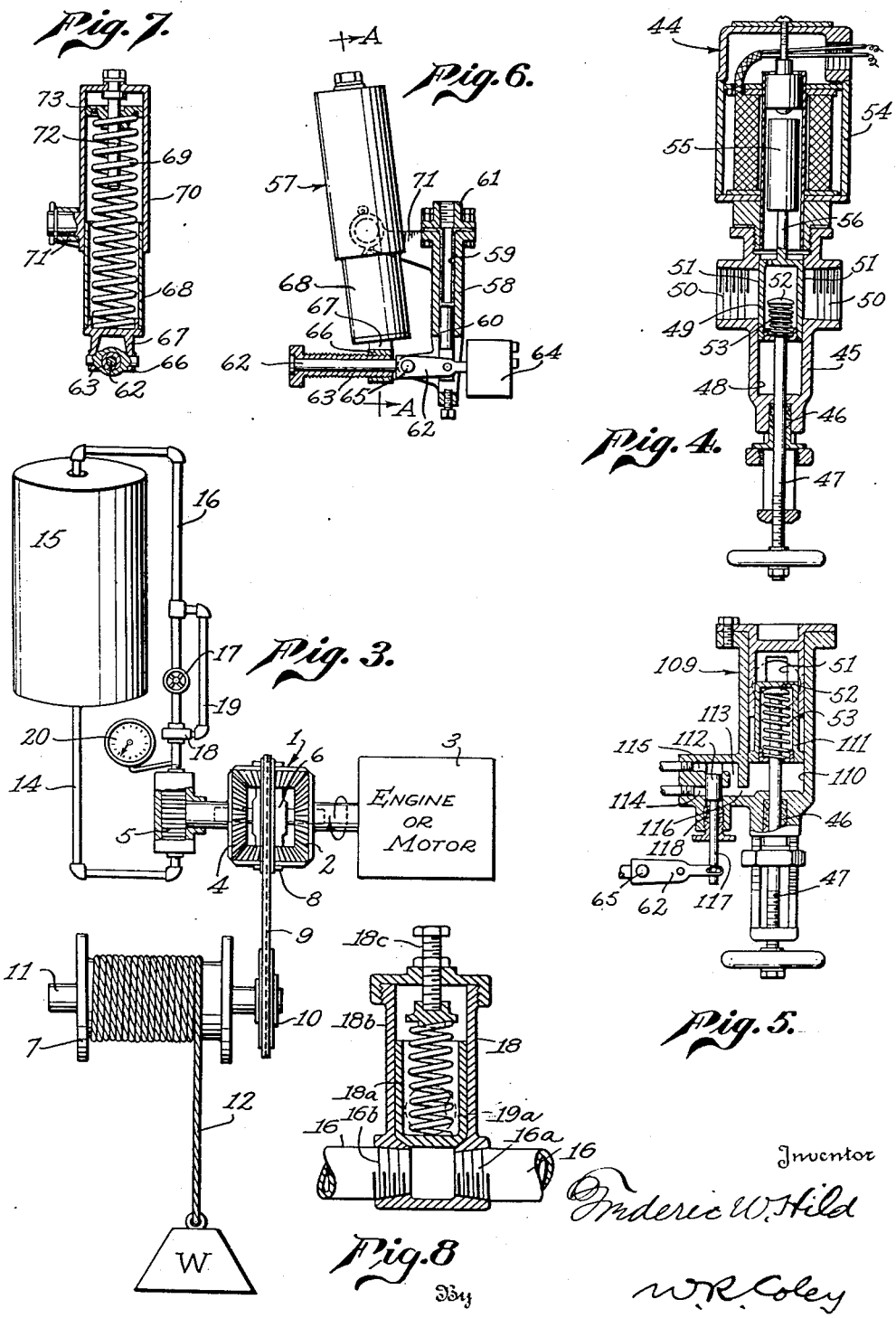

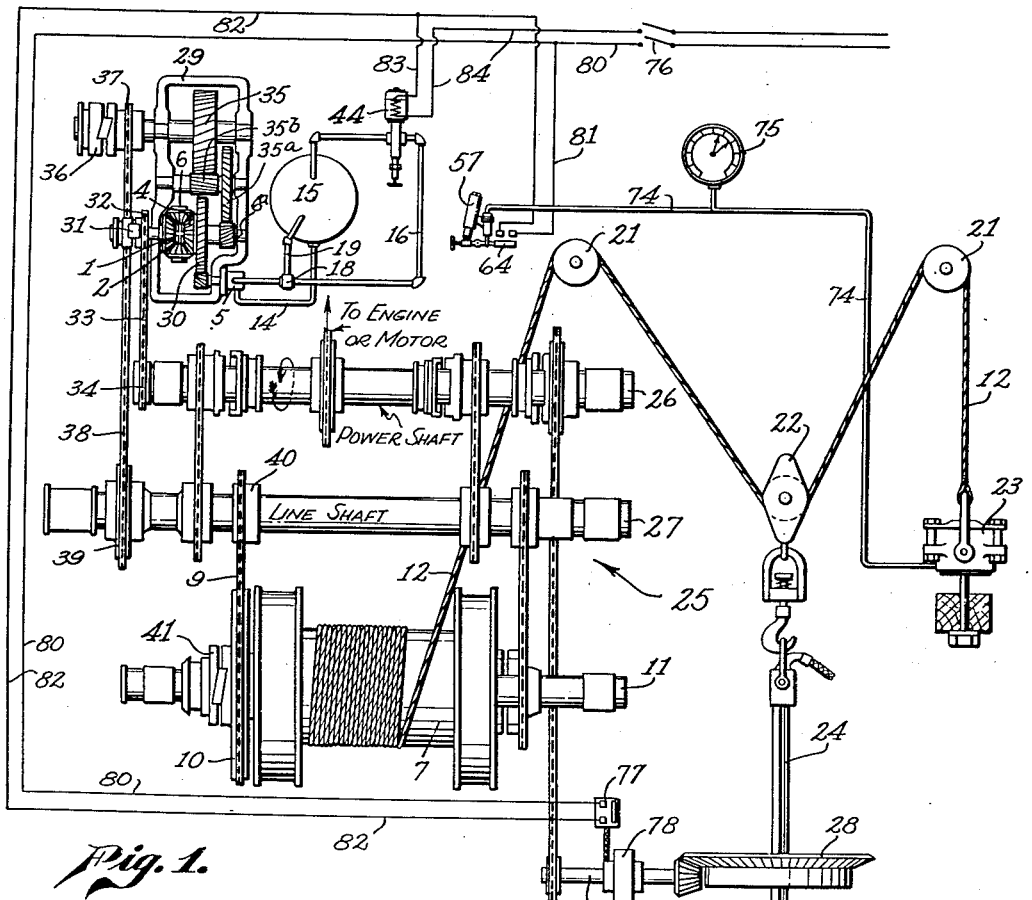

Patented Nov. 8, 1938

2,136,356

UNITED STATES PATENT OFFICE 2,136,356

DRILLING CONTROL

Frederic W. Hild, Los Angeles, Calif.

Application December 31, 1935, Serial No. 56,994

13 Claims. (Cl. 255—19)

My invention relates to control of variable speed mechanisms especially such as hoists and has particular application to feeding the drill in rotary well drilling.

There are two general methods of starting, stopping or varying the speed of work devices; One is by variable speed motor, the speed change occurring in the motor and therefore limiting its use to unit drive of a single work device. The other is by an intermediate device such as the friction clutch in which the speed change occurs. Except for small loads, the intermediate or clutch device is not practical for sustained speed variation. Such devices usually generate heat and are destructive of their working parts.

Gearing hydraulically controlled by a plunger pump, has been proposed but this inherently reflects the pulsations of the pump in the speeds and power transmitted to the work device particularly at low speeds. It is an object of the invention to provide an hydraulically controlled variable speed gearing which is inherently free of such fluctuations, and by means of which the speed and power of the work device may be varied and sustained between zero and maximum.

Devices for limiting torque input to a work device usually operate by cutting off the power input; examples are the shear pin and the electric overload circuit breaker. It is another object of the invention to provide a variable speed gearing having means for controlling and/or limiting the torque input to a work device without interrupting the power flow to the work device.

Application of my invention to rotary well drilling is herein illustrated and described. In this service a wide range of speed is necessary in all the operations. The duty of rapidly hoisting the heavy drill establishes the capacity of the power plant, since all the other operations such as driving the rotary and feeding the drill require much less power and may be performed by smaller power units. Special precautions are necessary to guard against fire and explosion. Thus for steam engine drive, the boilers must be installed a remote distance requiring long lines of steam pipe to the derrick. Variable speed electric motors have collector rings and commutators and brushes and the motors must be inclosed to render them "explosion proof" and often provided with special air blowers to cool them. The electrical resistances and the contactor switches must be remotely isolated from the derrick.

By means of my invention, a constant speed motor or engine may be used for all the varying speed and power operations of draw works and rotary machine and for feeding the drill. Moreover, thereby the hazard of fire and explosion due to the motive power will be practically eliminated.

Another object of the invention is to provide a variable power drive which will feed the drill downwardly or upwardly without changing the speed of the driving motor.

A further object is to provide an hydraulic retrieving feed for the drill which may be controlled optionally by the torque on the drill or by the weight on the bit, or by both together.

By means of my invention a single constant speed motor may drive the rotary machine at any speed up to full speed and simultaneously feed the drill automatically.

Another object is to provide a single variable speed gear for driving either the rotary machine or the draw works hoist.

Still another object is to provide a valve for controlling the feed of the drill either automatically or manually.

Other objects and advantages of my invention will be seen upon consideration of the description and the drawings herewith:

Figure 1 is a diagrammatic view of a rotary well drilling plant showing an embodiment of my invention.

Figure 2 shows in diagram the invention applied to electric drive for rotary well drilling.

Figure 3 is a diagrammatic view of an embodiment of the invention.

Figure 4 is a sectional view of a regulating valve of the type schematically shown in Figure 1.

Figure 5 is a partial view in section of the regulating valve arranged for hydraulic operation.

Figure 6 is an elevation view in part section of the control actuator for the regulating valve.

Figure 7 is a view in section taken on the line A—A of Figure 6, and

Fig. 8 is a cross-sectional view of a torque-limiting relief valve employed in my invention.

Referring first to Fig. 3, an apparatus embodying my invention comprises a differential gear 1 of which one sun gear 2 is connected to and is driven by an engine or motor 3; the other sun gear 4 is connected to and drives a pump 5 which may be a conventional type of two-gear oil pump. The planetary 6 of the differential gear is connected to a work device such as the hoist 7 by means of a suitable speed change gearing 8 including the chain 9 and the sprocket 10 on the hoist shaft 11. A line or cable 12 on the hoist 7 is secured to a load W which in the rotary drilling application would be the drill string.

The inlet of the pump 5 is connected by a pipe 14 to the bottom of a tank 15, and the pump outlet indirectly is connected to the top of the tank by a pipe 16. The tank contains a liquid which is circulated by the pump, the valve control for which includes the throttle valve 17 and the torque-limiting relief valve 18, both in the pump outlet to thus control the amount of liquid that may be returned to tank 15 through pipe 16.

As shown in Figure 8, the torque-limiting relief valve 18 has three parts 16a, 16b and 19a. The ports 16a and 16b are more directly for the pipe 16, whereas the third or relief port 19a is controlled by a piston or valve gate 18a. This piston or valve gate 18a is urged to a closed position by a spring 18b, the force of which may be adjusted by a screw 18c so that the valve gate may be opened at any selected fluid pressure on the pressure side of the valve gate. This means that the valve gate 18a, at a selected pressure, discharges some of the liquid through port 19a and thus through the by-pass pipe 19 to the tank 15 (see Figures 1, 2 and 3). When this pressure drops below a selected value, the valve 18a automatically closes the by-pass and normal circulation of the liquid through the throttle valve 17 is resumed. A pressure gage such as 20 shown in Figure 3 indicates the pressure in the fluid circulation system.

For rotary drilling, the line 12 is reeved through the crown block sheaves 21 and the traveling block 22, (see Fig. 1) the dead end of the line terminating in a weight converter 23 in which the pull of line 12 is converted to hydraulic pressure. The converter is anchored to the floor timbers. I prefer to use the weight converter described in my co-pending application Serial No. 756,002 for Power measuring devices filed December 4, 1934. Suspended from the traveling block 22 is the drill string 24 which corresponds to the load W of Figure 3. A conventional draw works 25 has the power shaft 26, the line shaft 27 and the hoist shaft 11 on which is mounted the hoist 7. The power shaft is chain driven by a suitable prime mover which may be an engine or motor (not shown). The usual sprockets, chains and clutches interconnect the three shafts of the draw works for providing multi-speed drive to the hoist 7 and for driving the rotary machine 28.

The differential gear 1 of Fig. 3 may be disposed in the reduction gear 29 of Fig. 1, the sun gear 4 of the differential being connected by a pair of gears 30 to the pump 5. On the sun gear 2 are mounted the clutch 31 and the sprocket 32 the latter being connected by chain 33 to sprocket 34 which is keyed to the power shaft 26 of the draw works. The planetary 6, referring more specifically to Figure 2, is connected, through the shaft 6a of the differential 1 and a train of gears 35, 35a, 35b and 35c to a clutch 36 and sprocket 37 on the final shaft of the train. The sprocket 37 is connected by a chain 38 to sprocket 39 keyed to the line shaft 27, onto which is also keyed a sprocket 40, the last named being connected by the chain 9 to the sprocket 10 and the clutch 41 on the hoist shaft 11. In Figure 3, the clutch 31, sprocket 32, chain 33 and sprocket 34 are omitted, and in lieu of them a sun gear 2 is directly connected to the constant speed motor 3.

During the lowering operation the torque at the hoist drum 7 due to the weight of load W or the drill string 24 will be transmitted through the speed change gearing to the planetary 6 of the differential gear 1, where the reduced torque will divide (equally in the bevel differential) to the two sun gears 2 and 4 and through these two and their respective gearings to the motor 3 and the pump 5 respectively. The power sun gear 2 is rotated in the direction for hoisting the load or drill and consequently the pump sun gear 4 rotates in the opposite direction.

Consider the load or the drill as suspended off bottom, then the torque at planetary 6 acts to rotate both sun gears. If motor 3 is electric, it may be rotated by power sun gear 2. In the rotary drilling application of Figure 1, the speed change gearing and the massive rotating machinery of draw works 25, rotary machine 28 and the large engine or motor which drives them greatly limit speed change so that the speed of power sun gear 2 will not change much and may be considered substantially constant. In Fig. 2 the electric motor 3 may be driven by the sun gear 2 through the pair of gears 42 to slightly above synchronous speed, the regeneration characteristic limiting the overspeed.

When the throttle valve 17 is wide open there is slight resistance to the pump discharge and therefore slight resistance by the pump 5 to the torque on pump sun gear 4, consequently the pump sun gear 4 rotates faster than the power sun gear 2, and the planetary 6 rotates at one half the algebraic sum of the sun gear speeds and in the direction of the greater speed, that is in the direction for lowering the load W or the drill string 24.

Upon restricting somewhat the pump discharge by the throttle valve 17, the resistance of the pump 5 increases, the speed of the pump and its sun gear 4 decreases and the rate of downward movement of the load W or the drill 24 lessens, until at a certain position of the valve opening, both sun gears are at equal speed. Thereupon the planetary 6, the reduction gearing, the hoist drum and tackle are substantially stationary and the load W or drill 24 does not move upwardly or downwardly. Upon moving the valve 17 farther toward closure, thereby further increasing the pump pressure and demanding more torque at the pump sun gear 4, then the planetary 6, the gearing and the drum begin rotating in the opposite direction, that is, for hoisting or retrieving the load W or the drill 24. The nearer the valve 17 approaches closure, the faster the upward movement of the load or drill, the maximum hoisting rate occurring when the fluid circulatory path to the tank 15 is closed as by the throttle valve 17 or by one of the automatic valves hereinafter described.

In Fig. 3, in the event the line 12 were attached to a load W greater than the safe limit of strength of the line or any of the mechanism between the load W and the engine or motor 3, then the torque-limiting valve 18 automatically operates to prevent overload and damage or injury, and will indicate the need of reducing the load W. Such overload demands high torque which causes fluid pressure in the pump 5 in excess of the release setting of relief valve 18. The valve automatically opens, thus lessening the fluid pressure and thereby provides definite limitation of torque or stress imparted by the engine 3 to safeguard all the members and parts of the hoisting equipment.

The pressure gage 20 provides a convenient means for weighing the load, because for a chosen spooled diameter of the hoist drum and with valve 17 closed, the hydraulic pressure is a definite measure of the weight of load W. This characteristic may be advantageously utilized for regulating automatically the feed of the drill in rotary drilling as later shown in the description of the hydraulic valve shown by Fig. 5.

For feeding the drill 24, the desired maximum rate of feed is established by the throttling position of valve 17. The feed may be automatically regulated to slower rate and to retrieval by a suitable regulating valve. This may be a conventional solenoid operated valve 43 in the pipe 16 (Fig. 2), or, the duties of both valves 17 and 43 may be combined in a single regulating valve 44 (Figures 1 and 4). In both cases the action of the regulating valve is controlled by the varying weight of the drill bit on bottom as transmitted by the weight converter 23. Optionally the regulating valve may be additionally or separately controlled by the torque on the drill pipe as transmitted by a torsion dynamometer in or to the rotary machine 28, or by current coil in the circuit of electric drilling motor M.

The regulating valve 44 has the body 45 one end of which has the usual packing arrangement 46 for the valve stem 47. The body 45 has a cylindrical bore 48 in which the hollow piston plunger 49 may be moved axially. The body has pipe threaded openings 50 which converge to form rectangular ports 51 of the bore 48 so that axial movement of the valve plunger 49 past the ports results in the volume flow of liquid through the valve to be proportional to the movement of the plunger. The end of the valve stem 47 forms a cap 52 and extends into the interior of valve plunger 49 to which the stem is resiliently secured by a spring 53 in such manner that the cap may bear directly against the inner end of the valve plunger 49 for moving the latter to close the valve ports 51. An electromagnet 54 secured to the other end of body 45 closes the bore 48, the solenoid 55 of the magnet being connected by a rod 56 to the valve plunger 49.

The regulating valve is installed with the magnet on top so that the spring 53 is aided by the force of gravity in always urging the valve and solenoid plungers downward to the open position of the valve ports. When the electromagnet 54 is energized, the solenoid 55 lifts the valve plunger 49 to close the the ports 51 and to compress the spring 53 against the cap 52 of the valve stem 47 which remains stationary. Upon de-energizing the magnet, the valve plunger drops downward until it rests again on the valve stem cap 52 thereby re-opening the ports 51 to the same position as before. A hole through the end of the valve plunger serves to balance the hydraulic pressure on the plunger.

The control actuator 57 (see Figs. 1, 2, 6 and 7) transmits the varying hydraulic pressure of weight converter 23 for automatically operating the regulating valves 43 and 44. This actuator utilizes the force transmitter disclosed in my aforesaid co-pending application Serial No. 756,002. It comprises the body 58 having a cylindrical bore containing the thimble diaphragm 59 and the actuator piston 60. The diaphragm is closed at one end, the other end which is open being flanged to form a gasket between the end of body 58 and the head 61, which is threaded to receive a pipe or pipe fitting, such as tubing 74. The outer end of actuator piston 60 engages a lever 62 on one end of which is rotatably mounted the adjusting screw bushing 63; the other end of the lever is connected to and may operate an electric switch 64. The fulcrum 65 for the lever 62 is between the actuator piston 60 and adjusting screw 63.

Threaded onto the adjusting screw 63 is trunnion nut 66 which receives the trunnion arms 67 of lower casing 68 which contains the lower portion of spring 69. The upper portion of the spring is contained by upper casing 70 which is pivoted on a bracket arm 71 of the body 58. A screw 72 threaded into a movable cap 73 in upper casing 70 varies the compression of spring 69. The adjusting screws 63 and 72 provide for varying through a wide range the spring force against the actuator piston 60.

Thus, hydraulic pressure tends to expand the thimble diaphram 59 and force its closed end against piston 60 and push the latter against the lever 62. This hydraulic force is opposed by the force of spring 69 acting through the lever 62, and when one force overbalances the other the electric switch 64 will be operated to open or close as desired.

A tubing 74 connects the weight converter 23 to the control actuator 57 and to a pressure gage serving as weight indicator 75 for indicating the suspended weight of the drill string and thereby also the weight of the bit on bottom.

In Figure 1 a source of electric energy is connected by a switch 76 to the actuator switch 64 and to a switch 77 which is operated by torsion dynamometer 78 on the shaft 79 of rotary machine 28. For this service the torsion dynamometer disclosed in my aforesaid co-pending application Serial No. 756,002, may be used. The electrical circuits are as follows: One contact in each of the switches 76—64 and 77 are connected together by wires 80 and 81. The other contact in each of switches 64 and 77 are connected to one terminal of electromagnet 54 of regulating valve 44 by wires 82 and 83. The other terminal of the magnet coil is connected to the remaining contact of switch 76 by the wire 84.

Consider the regulating valve 44 open sufficiently for the desired maximum rate of downward feed of the drill 24. Then if the weight on the bit becomes more than the amount for which the control actuator 57 is set, the diminished pull of line 12 decreases the hydraulic pressure in the weight converter 23 and the control actuator, so that the spring force of the actuator preponderates and closes switch 64, thereby energizing electromagnet 54 and pulling the regulating valve 44 toward or to closure, whereupon the feed of the drill lessens or is reversed. If the torque on the drill exceeds the amount for which the torsion switch 77 is set and the switch consequently is closed, then the magnet 54 is energized, the regulating valve 44 moves to closure and the feed lessens or reverses until the excessive torque condition is relieved.

When reaming the bored hole, the feed is at times definitely upward; if then the drill becomes stuck, or is "hung up" in the driller's parlance, the result would be an overload on the entire hoisting equipment. As described for Fig. 3, the torque-limiting relief valve 18 would operate to automatically reduce the fluid pressure in the pump 5 thereby lessening the hoisting effort; whereupon the drill would begin to move downwardly. But with the throttling position of valve 44 unchanged, the lessening of the fluid pressure would cause the relief valve 18 to return to closure, the drill then moving upwardly to again cut the formation. Thus we have automatic retrieval of the drill for upward feed, including regulation of the upward feed that would definitely limit the load and stresses on the hoisting and drilling equipment. The switch 76 may be open so that the regulation is accomplished without the aid of the torque devices of the rotary machine or the weight devices actuated by the pull of line 12 such as the weight converter 23, the actuator 57 or the solenoid of valve 44.

In Fig. 2, if motor 3 is not energized, then only the friction of the mechanism would retard the descent of the drill 24, and this might be disadvantageous, particularly when reaming. Therefore, motor 3, which may be a conventional three-phase constant speed induction motor, is provided with a conventional electromagnetic brake 85 having a magnet which is energized only when the motor is energized and acting then to hold the brake free and clear, and having the customary spring which automatically applies the brake to hold the motor shaft stationary when the magnet is not energized. The regulating valve 43, may be of the conventional solenoid type in which the valve is held fully open when its electromagnet is energized, the valve being closed when the electric circuit is open. Therefore the switch 64 is normally closed and is only opened by the control actuator 57 when the feed conditions require closing the regulating valve 43. Thus if the electric supply should fail, the regulating valve 43 will at once close, the brake 85 will stop motor 3, and the drill 24 will be held against downward movement.

The electrical circuits of Figure 2 include the switch 98 and leads 99 to motor 3, and the switch 100 and leads 101 to motor M. The magnet of brake 85 is connected to two of the leads 99 by the wires 102. A current coil 103 in one of the leads 101 is connected by wires 104 to a contactor switch 105 which is held normally closed by a spring 106. The contactor switch 105, the actuator switch 64 and the magnet coil of regulating valve 43 are connected in series by the wires 107 and 108 to two of the leads 99.

Should the torque on the drill 24 exceed the predetermined amount, the load on motor M increases, whereupon the current in coil 103 and in the magnet of contactor switch 105 increases, causing the magnet to overcome the spring 106 and the switch 105 then opens. Moreover as previously explained, too much weight on the bit will cause the actuator 57 to open switch 64. In either case the regulating valve 43 closes and the downward feed of the drill lessens or is reversed.

The constant speed motor M drives the rotary machine 28 through a gear differential 86, which reference character indicates a common form of differential such as shown in Fig. 1 of the patent to Mitchell No. 1,028,128. Driven external gear 91a meshes with gear 91 on shaft of pump 90. The pump inlet is connected by pipe 92 to the tank 15, and the pump outlet is connected to the tank by a pipe 93. The throttle valve 94 and torque-limiting relief valve 95 are in the pipe 93 to which also is connected the pressure gage 96. The discharge from the torque-limiting relief valve is carried to the tank by pipes 97 and 93.

When the throttle valve 94 is closed, the pump 90 will be stationary. Consequently, the output of motor M going into the rotary machine 28 will cause the latter to rotate to substantially full speed. Upon opening the valve, the pump members and gearing 91—91a begin rotating and begin circulating the liquid of tank 15 and at the same time the speed of the rotary decreases. As the valve is opened farther, the fluid pressure lessens, the pump rotates faster, circulating more liquid, and the speed of the rotary machine decreases correspondingly, until with the valve 94 wide open the pump is at maximum speed and the rotary machine is substantially stationary. Conversely, with motor M at full constant speed, the movement of valve 94 from wide open to closure effects starting the rotary machine from rest and gradually increasing to full speed, without jerk or declutching or changing of gears, and without danger of sparks or overheated resistances or overheated friction clutches or brakes.

Moreover, by means of the torque-limiting valve 95 which is similar to valve 18, the torque on the drill may be regulated and definitely limited to a predetermined value, without changing the weight on the bit, and without changing the rate of feed.

Tests have shown that additional to the work of cutting the formation, much of the torque on the drill during rotation is due to the resistance of the mud and cuttings in the hole, the torque increasing with the speed at a rate considerably above the first power, that is, the increase of torque being much greater than the increase of speed. It follows that by reducing the speed of the drill, the torque decreases more rapidly than the lessening of the speed.

This regulation is readily accomplished by the equipment connected to motor M, the current coil 103 and the switch 105 not being required. The motor M may be any constant speed prime mover such as a Diesel engine. The control is effected by the torque-limiting valve 95 in the manner previously described for valve 18.

The fluid pressure in the pump as indicated by the gage 96, will be a measure of the torque to the rotary machine 28 and hence of the torque on the drill 24.

The regulating valve 109 has the valve bore 110 containing the valve plunger 111, movement of which is effected by hydraulic pressure controlled by the pilot piston 112. This piston controls ports 114 and 115, both of which communicate with valve bore 110 through ducts 13 and 116. Port 114 admits liquid from any suitable pressure source; port 115 is the discharge or drain port and may lead to the tank 15. The pilot piston has a stem 117 passing through a suitable packing 118 and is connected to the control actuator 57 at the lever 62 in substitution for the switch 64. The valve plunger 111 may have two diameters, the larger diameter being at the end nearer the duct 116.

When the control actuator 57 moves the pilot piston 112 forward thereby closing port 115 and opening port 114, then liquid under pressure passes through port 114 and duct 116 into valve bore 110, forcing the valve plunger 111 upward and closing the valve ports 51. When the piston is moved back opening the discharge port 115 and closing the port 114, then valve plunger 111 urged by the spring 53 returns to open position of the valve ports 51, the liquid back of the plunger draining out through duct 116 and port 115.

The general relations of speed, torque and power transmitted by the members of a differential gearing are well known. In such as differential gear 1—6 it is understood that, the speed of the planetary member is a definite fraction of the algebraic sum of the speeds of the other two members (the sun gears) the algebraic signs being determined by the direction of rotation. When two separate motive powers are applied on two members of the differential gear to a load on the third member, the power of any member is the algebraic sum of the powers of the other two members, the algebraic signs being determined by power output and power input.

Although I have described several specific embodiments of my invention, it will be obvious to those skilled in the art, that various modifications may be made in the details of construction, the general arrangement, the association of the several co-operating parts and the application of my invention without departing from the spirit or the principles herein set forth.

I claim:

1. In a system of the character described, a prime mover operating at a selected speed, a differential device, connected to the prime mover, a fluid circulating system including fluid circulating means connected through the differential device to the prime mover, said fluid circulating means thus serving as a load for the prime mover, means disposed in the circulating system adapted to vary the resistance to the fluid flow produced by the fluid circulating means to thus alter the speed of the fluid circulating means, a drill string, means for feeding the drill string also connected to the differential device, and means constituting part of the differential device and responsive to one half of the algebraic sum of the speed of the fluid circulating means and the prime mover adapted to operate said means for feeding the drill string.

2. In a system of the character described, motor means operating at a selected speed, differential means connected to the motor means, a work device connected to be operated by the motor means, a fluid circulating system including fluid circulating means connected to the motor means to serve as a load for the motor means, means disposed in the circulating system adapted to vary the resistance to fluid flow in the system produced by the fluid circulating means in response to load conditions of the work device to thus alter the speed of the fluid circulating means, means for driving the work device, and means, constituting part of the differential means and responsive to one half of the algebraic sum of the speed of the fluid circulating means and the motor means, adapted to operate said means for driving the work device.

3. In a rotary drilling system having a drill feeding device and a drill rotating mechanism, motor means adapted to operate at a selected speed, a liquid circulating system including liquid driving means for moving the liquid in the circulating system, said driving means being connected to the motor means to serve as a load therefor, variable speed transmissions means connected to said motor means adapted to operate the drill feeding device, means for measuring the torque on the drill rotating means, and means for varying the resistance to liquid flow in the circulating system in response to torque conditions of the drill rotating mechanism as determined by the torque measuring means, whereby the speed of rotation of the drill feeding device is altered by a readjustment of the speed transmission.

4. In combination, a source of power, a fluid pressure pump and circulatory system therefor, a work device, a variable speed gearing connecting the source of power, pump and work device, and means responsive to load conditions of the work device for varying the pump load through said circulatory system thereby varying the speed of the pump and of the work device connected thereto.

5. In rotary well drilling apparatus having means for feeding a drill string and means for rotating it; motor means adapted to operate at a selected speed connected to said drill rotating means, a variable load also connected to said motor means, differential gearing connected between said motor means and said variable load, means, part of said differential gearing and responsive to the speed difference of the variable load and the motor means, adapted to operate the means for feeding the drill string, and means, responsive to the torque of the means for rotating the drill string, adapted to change the magnitude of the variable load to thus alter the speed of the means for feeding the drill string.

6. In rotary well drilling apparatus having means for feeding a drill string as well as means for rotating it; a movable source of power, a fluid pump, means forming a circulatory path for the fluid through the pump, means incorporated in said path for varying its resistance to the passage of fluid for varying the load and in consequence the speed of the pump, a differential mechanism connected between said source of power and said pump, means, part of the differential mechanism and responsive to the difference in speed between the fluid pump and the source of power, adapted to operate said means for feeding the drill string, electroresponsive means for controlling said resistance varying means, a source of electric energy therefor, and a circuit controller for said electroresponsive means actuated in response to variations of the weight sustained at the bore bottom.

7. In a rotary well drilling system, a motor, a fluid circulatory system adapted to serve as a load for said motor, means for varying the load by varying the resistance to circulation, a rotary drill string feeding mechanism therefor connected to said motor, and means responsive to variations of the weight of the string incident to operation of said feeding mechanism for actuating the load varying means.

8. In well drilling apparatus that includes a rotary drill string, a motor for rotating the string, and a hoist for controlling the amount of weight of the drill string sustained by the bottom of the well, the combination of a supplemental rotary load for the motor, a differential interconnecting the motor with the supplemental rotary load, means, part of the differential and responsive to the speed difference between the supplemental rotary load and the motor, adapted to control the operation of the hoist, and means, acting in response to the exertion of a limiting maximum torque on the string for decreasing the rate of rotation of the supplemental load.

9. In well drilling apparatus that includes a rotary drill string, a motor for rotating the string, and a hoist for controlling the amount of weight of the drill string sustained by the bottom of the well, the combination of a fluid circulation system, including a fluid circulating pump, forming a supplemental rotary load for the motor, a differential interconnecting the motor and the pump, means, part of the differential and responsive to the speed difference between the motor and the pump, adapted to operate the hoist, and means, acting in response to the exertion of a limiting maximum torque on the string for interposing a resistance to fluid flow in the circulatory system to thus alter the speed of the pump and in consequence the speed of the hoist.

10. In well drilling apparatus that includes a rotary drill string, a motor for rotating the string, and a hoist for controlling the amount of weight of the drill string sustained by the bottom of the well, the combination of a supplemental rotary load for the motor, a differential interconnecting the motor and the rotary load, means, part of the differential and responsive to the speed difference between the motor and the rotary load, adapted to operate the hoist, and means, acting in response to the sustaining of a definite maximum weight by the bottom of the well for causing the rate of rotation of the supplemental rotary load to reduce or reverse the axial motion of the string.

11. In well drilling apparatus that includes a rotary drill string, a feeding hoist adapted to lower and raise the string, as well as a substantially constant speed source of power for tending to operate the hoist in an upward direction, the combination of a transmission mechanism between the hoist and the source of power for continuously varying the hoist speed and direction through standstill, means continuously controlling the mechanism, and means operating on the controlling means in response to a predetermined limiting force on the hoist for varying the rate of upward travel of the hoist.

12. In apparatus that includes a hoist adapted to lower and raise a load, as well as a substantially constant speed source of power for tending to operate the hoist in an upward direction, the combination of a transmission mechanism between the hoist and the source of power for continuously varying the hoist speed and direction through standstill, said transmission mechanism includes differential gearing and a fluid pump acting as a load for one element of the gearing, means for controlling said pump acting normally to cause the hoist to move the load upwardly, and means operating to vary the pump load in response to the load on the hoist for varying the rate of upward travel of the hoist.

13. In well drilling apparatus that includes a rotary drill string, a mechanism for imparting rotation to the string, and a source of power having substantially constant speed, the combination of a transmission mechanism between the rotation-imparting mechanism and the source of power for continuously varying the rate of rotation of the string, said transmission mechanism including differential gearing and a fluid pump acting as a load for one element of the gearing, means for controlling the load on the pump to thus control the pump speed, and means operating to vary the pump load in response to torque on the string to thus through the differential control the rate of rotation of the string.

FREDERIC W. HILD.